US008425869B2

(12) United States Patent
Sato et al.

(10) Patent No.: US 8,425,869 B2
(45) Date of Patent: *Apr. 23, 2013

(54) NOX PURIFYING CATALYST

(75) Inventors: Naohiro Sato, Saitama (JP); Osami Yamamoto, Saitama (JP); Koichi Inaba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 186 days.

This patent is subject to a terminal disclaimer.

(21) Appl. No.: 12/669,376

(22) PCT Filed: Jul. 4, 2008

(86) PCT No.: PCT/JP2008/062187
§ 371 (c)(1),
(2), (4) Date: Jan. 15, 2010

(87) PCT Pub. No.: WO2009/011237
PCT Pub. Date: Jan. 22, 2009

(65) Prior Publication Data
US 2010/0204036 A1    Aug. 12, 2010

(30) Foreign Application Priority Data
Jul. 17, 2007 (JP) ................. 2007-185493

(51) Int. Cl.
*B01D 53/56* (2006.01)
*B01J 21/00* (2006.01)
*B01J 21/06* (2006.01)

(52) U.S. Cl.
USPC .......... 423/235; 423/237; 423/239.2; 502/74; 502/64

(58) Field of Classification Search .................. None
See application file for complete search history.

(56) References Cited

U.S. PATENT DOCUMENTS

| 6,689,709 B1 * | 2/2004 | Tran et al. ............... 502/65 |
| 7,287,370 B2 * | 10/2007 | Rajaram et al. ............ 60/274 |
| 2007/0144156 A1 * | 6/2007 | Gandhi et al. ............ 60/297 |
| 2008/0034740 A1 * | 2/2008 | Strehlau et al. ............ 60/299 |

FOREIGN PATENT DOCUMENTS

| EP | 1 685 891 A1 | 8/2006 |
| EP | 1870378 | * 6/2007 |
| EP | 1 889 651 A1 | 2/2008 |
| EP | 2 048 333 A1 | 4/2009 |
| JP | 05-220403 A | 8/1993 |
| JP | 06-111838 A | 4/1994 |
| JP | 06-316416 A | 11/1994 |
| JP | 2600492 B2 | 1/1997 |
| JP | 11-300211 A | 11/1999 |
| JP | 2001-179100 A | 7/2001 |
| JP | 2001231332 | * 2/2003 |
| JP | 2005-177570 A | 7/2005 |
| JP | 2006-314989 A | 11/2006 |
| WO | WO-93/07363 A1 | 4/1993 |
| WO | WO-98/26867 A1 | 6/1998 |
| WO | WO-2005/044426 A1 | 5/2005 |
| WO | WO-2007/074599 A1 | 7/2007 |
| WO | WO 2008/015992 A1 | 2/2008 |

OTHER PUBLICATIONS

Supplementary European Search Report issued to EP Application No. 08777902.1, mailed Jun. 14, 2011.

* cited by examiner

*Primary Examiner* — Melvin C Mayes
*Assistant Examiner* — Sheng H Davis
(74) *Attorney, Agent, or Firm* — Arent Fox LLP

(57) ABSTRACT

Disclosed is a NOx purifying catalyst which is capable of removing NOx sufficiently efficiently even during operations at low temperatures such as operations in diesel cars. Specifically disclosed is a NOx purifying catalyst for processing NOx in an exhaust gas by performing lean/rich control of air-fuel ratio of the exhaust gas. This NOx purifying catalyst comprises at least a first catalyst layer containing a β zeolite containing iron element and a second catalyst layer containing a noble metal, a cerium oxide material and a specific zirconium oxide material. The second catalyst layer and the first catalyst layer are sequentially arranged on a carrier in such a manner that the first catalyst layer forms the uppermost layer.

6 Claims, 1 Drawing Sheet

NOX PURIFYING CATALYST

CROSS-REFERENCE TO RELATED APPLICATION

This application is a National Stage entry of International Application No. PCT/JP2008/062187, filed Jul. 4, 2008, which claims priority to Japanese Application No. 2007/185493, filed Jul. 17, 2007, the entire specification claims and drawings of which are incorporated herewith by reference.

TECHNICAL FIELD

The present invention relates to a NOx purifying catalyst that can remove NOx, for example, in the exhaust gas of an automobile or the like with sufficient efficiency, and more specifically relates to a NOx purifying catalyst that can remove NOx with sufficient efficiency even under a low temperature operating range such as that of a diesel vehicle.

BACKGROUND ART

Thus far, a NOx purifying catalyst has been researched that can effectively decrease NOx (nitrogen oxide) in the exhaust gas of an automobile or the like. Above all, decreasing NOx along with PM (particulate matter) has been an important issue in diesel vehicles.

In diesel vehicles, typically, an oxidation catalyst (DOC) and a diesel particulate filter (DPF) have been arranged in the exhaust path of the diesel engine. However, in the case of further decreasing NOx being demanded in the future, a simple combination of the conventional DOC/DPF will not be sufficient.

Thus, as a method to further decrease NOx in exhaust gas, for example, an exhaust gas purifying apparatus of an internal combustion engine has been disclosed in Patent Document 1 detailed below that is configured so as to use a NOx absorbent that absorbs NOx when the air/fuel ratio of the exhaust gas is lean and releases the NOx thus absorbed if the oxygen concentration in the exhaust gas drops, and the NOx absorbed when the exhaust gas is lean is released from the NOx absorbent when the oxygen concentration in the exhaust gas has dropped.

Patent Document 1: Japanese Patent Publication No. 2600492

DISCLOSURE OF THE INVENTION

Problems to be Solved by the Invention

However, the NOx absorbent used in the exhaust gas purifying apparatus of Patent Document 1 employs an alkali metal, alkali earth metal, or the like. Furthermore, a noble metal such as platinum is used in the oxidation of HC, CO and NOx in a lean state and the reduction of NOx in a rich state. Due to this, there has been a problem in that the activity of the noble metal drops easily, and particularly the NOx purification ability at low temperatures drops, since a material with strong basicity is used as the NOx absorbent in Patent Document 1.

In addition, since a material with strong basicity is used as the NOx absorbent, the binding thereof with SOx, which has stronger acidity than NOx, becomes stronger. As a result, there has also been a problem in that catalyst regeneration at low temperatures is difficult because higher temperatures become necessary in regeneration after sulfur poisoning.

More specifically, the NOx purification catalyst described in Patent Document 1 achieves a predetermined effect in the case of operating mainly in a high temperature range such as that of a gasoline engine; however, in the case of the operating range often being no greater than 300° C., for example, such as for a diesel engine, the NOx decreasing effect is insufficient.

The present invention takes into account the above problems, and has an object of providing a NOx purifying catalyst that can remove NOx with sufficient efficiency, even under a low temperature operating range such as that of a diesel vehicle.

Means for Solving the Problems

The present inventors have discovered that the removal efficiency of NOx under a low temperature operating range could be improved by combining a first catalyst layer that includes a zeolite-based catalyst having elemental iron, and a second catalyst layer that includes a noble metal, a cerium oxide-based material, and a specific zirconium oxide-based material, and laminating so as to make the first catalyst layer the top layer, thereby arriving at completing the present invention. More specifically, the present invention provides the following.

According to a first aspect, in a NOx purifying catalyst used for purification of NOx in exhaust gas emitted from an internal combustion engine in which an air/fuel ratio is controlled to be in a lean or rich state, the catalyst includes a first catalyst layer and a second catalyst layer; NOx passes through the first catalyst layer, and the NOx having thus passed through is oxidized and adsorbed by the second catalyst layer, in the lean state; the NOx thus adsorbed by the second catalyst layer is converted to $NH_3$ by a reducing component on the second catalyst layer, and then the $NH_3$ is adsorbed by transferring to the first catalyst layer, in the rich state; the $NH_3$ subsequently reacts with NOx to be converted to nitrogen and water; the first catalyst layer includes a beta zeolite having elemental iron; the second catalyst layer includes A) a noble metal, B) a cerium oxide-based material, and C) a zirconium oxide-based material having at least one selected from the group consisting of scandium, yttrium, and a rare-earth metal; and the second catalyst layer and the first catalyst layer are sequentially laminated on a carrier, and the first catalyst layer is formed so as to be a top layer.

The NOx purifying catalyst according to the first aspect of the invention removes NOx with sufficient efficiency in the below way. In a state in which the air/fuel ratio of the exhaust gas is lean, the NOx in the exhaust gas first easily passes through the first catalyst layer of the upper layer, which is a solid acid catalyst, and then reaches the second catalyst layer being the lower layer. The NOx contacts the second catalyst layer, and is temporarily adsorbed (temporarily stored) to the second catalyst layer while being oxidized by the noble metal such as platinum in the second catalyst layer. Here, the noble metal such as platinum functions as a catalytically active species that oxidizes NOx (e.g., NO to $NO_2$).

Next, the air/fuel ratio of the exhaust gas is made to be a rich state. When this is done, the NOx adsorbed to the second catalyst layer is converted to ammonia by way of hydrogen generated in the water-gas shift reaction, and this ammonia travels to the first catalyst layer and is adsorbed (stored again). This storing again takes place easily due to the second catalyst layer and the first catalyst layer being laminated to be adjacent.

Thereafter, when the air/fuel ratio of the exhaust gas is returned to lean again, ammonia stored again in the first catalyst layer and the NOx contained in the exhaust gas are converted to nitrogen and water by way of the ammonia selective catalytic reduction process, and this nitrogen is released from the surface of the first catalyst layer. At this time, since the first catalyst layer is the top layer, the nitrogen thus reduced is efficiently released from the top most surface. It should be noted that, at this time, the above-mentioned temporary storage progresses in concert.

In the above way, in the lean state, NOx is temporarily stored inside the second catalyst layer and the ammonia stored again inside the first catalyst layer is converted to nitrogen and water, and released, by repeatedly carrying out lean/rich control of the exhaust gas in predetermined cycles. Meanwhile, in the rich state, the NOx thus being temporarily stored is converted to ammonia and stored again in the first catalyst layer. By this means, it is possible to continuously purify NOx. Then, since a sequence of a cycle, which is defined by temporary storage of NOx, conversion to ammonia, storing again of ammonia, reduction and release as nitrogen, takes place more efficiently by making a layered configuration in which the top layer is the first catalyst layer and the lower layer is the second catalyst layer, it is possible to improve the NOx decreasing efficiency. It should be noted that the above-mentioned operation is explained in more detail in the embodiments described later.

Furthermore, the solid acid catalyst of the first catalyst layer in the present invention is a beta zeolite containing elemental iron. Since the beta zeolite excels in ammonia adsorption capacity even as NOx passes therethrough, and is also comparatively high in heat resistance, it is suitably used in the present invention. It should be noted that, as described below, it is preferable for the beta zeolite to be ion-exchanged with Fe.

Furthermore, in the present invention, the second catalyst layer includes noble metal, a cerium oxide-based material, and a specific zirconium oxide-based material. With this configuration, the above-mentioned temporary storage of NOx and storing again progress efficiently. In particular, by including the specific zirconium oxide-based material, hydrogen generation of a water-gas shift catalyst is prompted, whereby ammonia generation in the second catalyst layer is promoted. As a result, hydrogen generating capacity, which was low at 300 to 400° C. on the high temperature side, can be improved with only the cerium oxide-based material, whereby the NOx purification rate on the high temperature side can be improved.

It should be noted that, in the NOx purifying catalyst of the present invention, "adsorption" is performed in two stages of temporary storage and storing again, without performing "absorption" so as to trap the NOx internally, as in the NOx absorbent of Patent Document 1 mentioned above. Furthermore, there is no use of an alkali metal or alkali earth metal or the like having strong basicity. As a result, superior effects are achieved that are not found conventionally in that the catalytic activity of the noble metal does not drop even at low temperatures, and NOx can be removed with sufficient efficiency even under a low temperature operating range that is mainly 300° C. or lower such as in a diesel vehicle.

Here, a lean state indicates a state in which the air to fuel ratio (air/fuel ratio) is large (i.e. a state in which the fuel concentration is low), and a rich state indicates a state in which the air to fuel ratio (air/fuel ratio) is small (i.e. a state in which the fuel concentration is high).

According to a second aspect, in the NOx purifying catalyst as described in the first aspect, the zirconium oxide-based material includes the rare-earth metal; zirconium in the zirconium oxide-based material is at least 50 wt % by oxide conversion; and the rare-earth metal in the zirconium oxide-based material is in the range of 5 to 30 wt % by oxide conversion.

According to this aspect, the hydrogen generating capacity can be improved particularly on the high temperature side, whereby the NOx purification rate on the high temperature side can be improved.

According to a third aspect, in the NOx purifying catalyst as described in the first or second aspects, the beta zeolite having elemental iron in the first catalyst layer further includes elemental cerium.

According to the third aspect, by adding elemental cerium, adsorption of NOx is carried out by the oxygen storage/release ability, and suppression of catalyst poisoning can be expected due to the reducing component from the oxygen storage/release ability. By using both components together in this way, these functions act synergistically and a more superior effect as a catalyst is exhibited.

According to a fourth aspect, in the NOx purifying catalyst as described in any one of the first to third aspects, the reducing component is at least one component in the exhaust gas selected from the group consisting of carbon monoxide, a hydrocarbon component, and hydrogen generated from at least one of the carbon monoxide and hydrocarbon component contacting the second catalyst layer.

In the present invention, NOx adsorbed to the second catalyst layer in a rich state is converted to $NH_3$ by reducing components on the second catalyst layer as described above. At this time, according to the fourth aspect, NOx adsorbed on the second catalyst layer can be efficiently converted to $NH_3$ by using the above reducing component in the exhaust gas.

According to a fifth aspect, in the NOx purifying catalyst as described in any one of the first to fourth aspects, the second catalyst layer further includes a heat-resistant inorganic oxide.

According to the fifth aspect, by including a heat resistant inorganic oxide, the generation of hydrogen by way of the water-gas shift reaction takes place with good efficiency at 300° C. and above. As a result, conversion from NOx to ammonia in the rich state can be carried out with higher efficiency.

According to a sixth aspect, in the NOx catalyst as described in any one of the first to fifth aspects, the cerium oxide-based material is at least one of cerium oxide and a composite oxide of cerium and a rare-earth element.

According to the sixth aspect, by using at least one of cerium oxide and a composite oxide of cerium and a rare-earth element, and preferable cerium oxide and the composite oxide, as the cerium oxide-based material, adsorption of NOx to the second catalyst layer is promoted. It should be noted that at least one element selected from rare-earth elements such as praseodymium (Pr), lanthanum (La) and neodymium (Nd) are preferred as the rare-earth element.

According to a seventh aspect, in the NOx purifying catalyst as described in any one of the first to sixth aspects, the second catalyst layer is configured so that content of the noble metal decreases sequentially or step-wise from a side of the first catalyst layer toward a carrier side thereof.

According to the seventh aspect, since noble metal is abundantly present at a region more toward the top side (side near the top most surface) of the second catalyst layer, oxidation of NOx and production of ammonia from the water-gas shift reaction become dominant in the lean state. On the other hand, since there is a region in which little to no noble metal is present at a lower side (side near the carrier) region of the second catalyst layer, temporary storage of NOx becomes dominant. Accordingly, NOx decreasing efficiency can be further improved.

It should be noted that, although there is no particular limitation to a configuration such that "content of the noble metal decreases sequentially or step-wise from a side of the first catalyst layer towards a carrier side", it may be a configuration in which an amount of noble metal decreases continuously in a thickness direction of the layer, and may be a configuration such that the second catalyst layer is formed by multiple layers of at least two layers, and the amount of noble metal in each layer decreases step-wise. It should be noted that a case of having a layer that does not substantially contain noble metal at a carrier side of the layer is also included in the aspects of the present invention.

Effects of the Invention

According to the present invention, it is possible to provide a NOx purifying catalyst that can remove NOx with sufficient efficiency even in an operating range in which the catalyst temperature is in a low region. As a result, the present invention can be suitably used in a diesel vehicle or the like.

PREFERRED MODE FOR CARRYING OUT THE INVENTION

Figure 1:
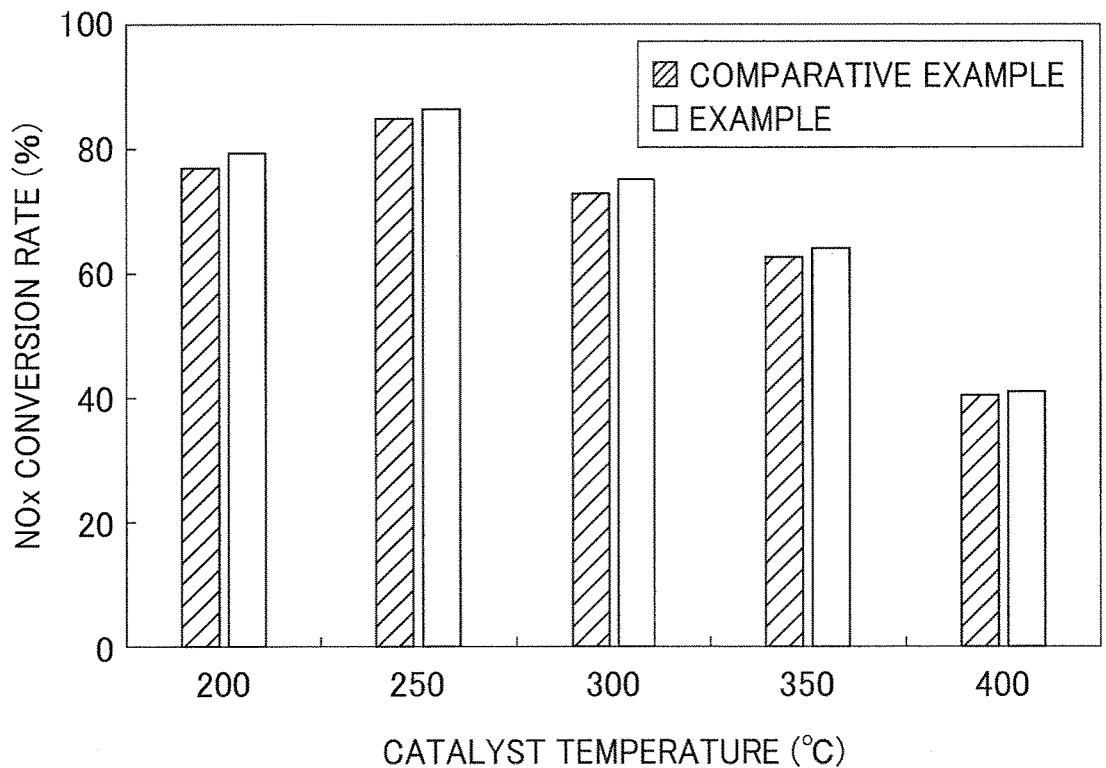
FIG. 1 is a chart showing characteristics of NOx conversion versus catalyst temperature according to Example.

Hereafter, an example of a NOx purifying catalyst according to the present invention is explained in detail.
NOx Purifying Catalyst Configuration The NOx purifying catalyst according to the present embodiment is a catalyst of integrated structure type composed of a carrier coated with at least two different catalyst layers, and is provided with at least a first catalyst layer that includes a zeolite-based catalyst having elemental iron, and a second catalyst layer that includes a noble metal, a cerium oxide-based material and a specific zirconium oxide-based material.
First Catalyst Layer
Constituents In the NOx purifying catalyst of the present invention, the first catalyst layer is preferably used as a top surface layer that directly contacts the exhaust gas. In addition, it preferably does not substantially include a platinum component, and more preferable does not include any noble metal component.

This first catalyst layer includes a solid acid catalyst having ammonia adsorption capacity. A beta zeolite catalyst is used as the solid acid catalyst. In addition, this beta zeolite includes elemental iron. Although the reason why the exhaust gas purification ability, and particularly the NOx purification ability, is improved by adding elemental iron to the zeolite catalyst is not exactly known, it is assumed that adsorption of NOx and reducing components to the zeolite is promoted by elemental iron.

It should be noted that elemental cerium may further be added and ion-exchanged in addition to elemental iron. By adding elemental cerium, adsorption of NOx is carried out by the oxygen storage/release ability, and suppression of catalyst poisoning can be expected due to the reducing component from the oxygen storage/release ability. By using both components together in this way, these functions act synergistically and a more superior effect as a catalyst is displayed.

The beta zeolite employed in the present invention has a relatively complex three-dimensional pore structure consisting of generally linear pores having a relatively large diameter arranged in one direction and curved pores intersecting these, and thus has a property such that diffusion of cations during ion-exchange and diffusion of hydrocarbon molecules during reduction is easy. This is recognized to be a unique structure compared to mordenite, faujasite, and the like, which only have linear holes arranged in one direction. In addition, since beta zeolite also has high thermal durability due to such structural characteristics, it is possible to impart superior heat resistance to the catalyst by use as the catalyst to be employed in the present invention.

The addition of elemental iron or elemental cerium to the beta zeolite of the present invention can be performed by adding to the beta zeolite as an iron salt or cerium salt solution; however, a commercially available beta zeolite prepared with elemental iron and elemental cerium added may also be used.

In addition, according to a beta zeolite made in this way, it is possible to prepare a situation in which elemental iron or elemental cerium is ion-exchanged to cation sites of the beta zeolite. In the case of a beta zeolite thus ion-exchanged, the NOx purification ability of the present invention is improved; however, it has be considered whether one of the main causes for this is the stabilizing of the skeletal structure of the beta zeolite by ion-exchange.
Blending Amount of Each Constituent Although the blending amount of beta zeolite contained in the first catalyst layer can be suitably set and is not particularly limited, it is preferably 5 to 300 g/L per unit volume of the overall catalyst of the present invention, and more preferably 30 to 150 g/L. If the blending amount is at least 5 g/L, it is possible to exhibit the exhaust gas purification ability according to the present invention, and if no greater than 300 g/L, air permeability of exhaust gas in the honeycomb can be sufficiently maintained.

In addition, the elemental iron added to the beta zeolite is preferably 0.1 to 10 wt % by oxide conversion relative to the zeolite, and is more preferably 0.5 to 5 wt %. If the added amount exceeds 10 wt %, the active solid acid sites can no longer be maintained and activity drops, and heat resistance also drops, and as long as it is no less than 0.1 wt %, sufficient NOx purification performance can be obtained.

In the case of additionally adding elemental cerium, the elemental cerium added into the beta zeolite is preferably 0.05 to 5 wt % by oxide conversion relative to the zeolite, and more preferably 0.1 to 3 wt %. If at least 0.05 wt %, catalyst poisoning by reducing components in the exhaust gas can be prevented; however, if it exceeds 5 wt %, the active solid acid sites cannot be maintained, and the activity and heat resistance drops.
Second Catalyst Layer
Constituents In the second catalyst layer, A) noble metal such as platinum, B) cerium oxide-based material, and C) a zirconium oxide-based material containing at least one selected from scandium, yttrium, and a rare-earth metal are added. This is because NOx purification ability is improved by synergism between the cerium oxide-based material and the noble metal such as platinum. Although the reason that the NOx purification ability is improved in this way is not exactly known, the poisoning of platinum being prevented by the reducing component and the adsorption function of NOx can be considered as causes thereof.

Furthermore, in the present invention, by containing the above specific zirconium oxide-based material, hydrogen generation by a water-gas shift catalyst is prompted, whereby ammonia generation in the second catalyst layer is promoted. As a result, hydrogen generating capacity, which was low at 300 to 400° C. on the high temperature side, can be improved with only the cerium oxide-based material, whereby the NOx purification rate on the high temperature side can be improved.

A) Noble Metal

Although gold, palladium, and rhodium can be used as necessary as noble metals, since the activity is high for that in which platinum is the essential component, it is preferred that platinum is employed as a main component. Here, main component indicates platinum being contained to be at least 50 wt % of the overall noble metal.

Although the reason that purification of NOx in exhaust gas is promoted by employing platinum is not exactly known, a cause thereof can be considered to be the NO accounting for a large portion in the exhaust gas being oxidized to $NO_2$, and reaction with the reducing component being promoted by this $NO_2$ being adsorbed to the cerium component of the catalyst employed in the present invention.

The noble metal is employed by supporting on a heat resistant inorganic oxide; however, as such a heat resistant inorganic oxide, so long as being an inorganic oxide such as an alumina-based material, a zeolite-based material, a silica-based material, it can be broadly selected from among these, in addition to the cerium oxide-based material and zirconium oxide-based material used in the second catalyst layer of the present invention. In addition, in regards to supporting onto the heat resistant inorganic oxide, it is also possible to be supported entirely on a heat resistant inorganic oxide that configures the second catalyst layer; however, it may be supported on a specific inorganic oxide as well.

B) Cerium Oxide-Based Material

As the cerium oxide-based material employed in the present invention, cerium oxide or a cerium oxide-zirconium oxide composite oxide, or a material to which a variety of auxiliary materials have been added to these oxides can be used. It should be noted that, in the case of employing a cerium oxide-zirconium oxide composite oxide, containing at least 10 wt % of cerium by oxide conversion in the composite oxide is preferred, containing at least 30 wt % is more preferred, and containing at least 50 wt % is most preferred.

It is possible to add a rare-earth element such praseodymium, neodymium, lanthanum, samarium and cerium as additives to the cerium oxide-based material employed in the present invention. Such additives are captured inside the crystal structure of the cerium oxide-based material, and preferably exist stably in a state such as a metal or oxide. It is possible that heat resistance and durability of the cerium oxide-based material are improved by existing in this way.

Thus, cerium oxide and/or a composite oxide of cerium and a rare-earth element are preferred as the cerium oxide-based material, which is a cerium oxide-based material such as cerium oxide and the composite oxide, for example, such as $CeO_2$+Ce—Pr—La—Ox.

Although a commercially available cerium oxide-based material may be used as the cerium oxide-based material, it can be obtained by a well-known method. For example, according to the method described in Japanese Patent Application Publication No. H06-316416, it can be obtained by mixing cerium sol with a nitrate such as of praseodymium, neodymium, lanthanum and samarium, and zirconium sol as required, and then drying and firing.

C) Zirconium Oxide-Based Material

The zirconium oxide-based material of the present invention is a zirconium oxide-based material that contains at least one type selected from scandium, yttrium, and rare-earth metals. Among these, it is preferable to contain rare-earth metal, for zirconium to be at least 50 wt % by oxide conversion in the zirconium-based material, and for rare-earth metal to be 5 to 30 wt % by oxide conversion in the zirconium-based material.

It is preferable if zirconium is at least 50 wt % by oxide conversion, since hydrogen generation is promoted from 300° C. to 400° C. It is preferable if rare-earth metal is at least 5 wt % by oxide conversion in the zirconium-based material, since hydrogen generation is further promoted and NOx adsorption capacity is also improved under the lean state, and it is preferable if the rare-earth metal in the zirconium-based material is no greater than 30 wt % by oxide conversion since heat resistance is maintained.

As rare earths, for example, rare-earth elements such as praseodymium, neodymium, lanthanum, samarium, and cerium can be added. Such additives are captured inside the crystal structure of the zirconium oxide, and preferably exist stably in a state such as a metal or oxide. It is possible that heat resistance and durability of the zirconium oxide-based material are improved by existing in this way.

Thus, more specifically, a zirconium oxide to which yttrium has been added can be exemplified as the zirconium oxide-based material. In addition, the crystal structure of zirconium oxide to which yttrium has been added can employ a monoclinic crystal, cubic crystal, a tetragon, or a complex of these. Furthermore, a commercially available material known as yttria-stabilized zirconia may be used as the zirconium oxide-based material to which yttrium has been added. The yttria-stabilized zirconia has oxygen vacancies formed in this crystal structure by causing yttrium oxide to form a solid solution in zirconia, and is a structurally stabilized compound. For such yttria-stabilized zirconia, there are completely stabilized zirconia doped with yttrium in the crystal so that transformation of the crystal structure can be completely suppressed, and partially stabilized zirconia made by reducing the doping amount of yttrium so that a portion of the zirconium can transform; however, either can be used in the present invention. The added amount of yttrium to zirconium oxide is preferably 1 to 20 wt % by oxide conversion, and more preferably 1 to 10 wt %. If the added amount of yttrium is reduced, the NOx purifying performance of the present invention is not obtained, and if the amount of yttrium is overly abundant, the crystal structure of zirconia lacks stability, and the NOx purifying performance of the present invention for an extended period may be reduced.

Such a zirconium oxide to which yttrium has been added can be produced by various well-known methods. A coprecipitation method and an impregnation method can be exemplified as examples of well-known methods. For the case of coprecipitation, a water-soluble yttrium salt such as yttrium nitrate and yttrium sulfate is dissolved with a water-soluble zirconium salt such a zirconium nitrate and zirconium sulfate simultaneously or separately at a predetermined quantitative ratio according to a predetermined mass ratio, and then mixed by agitation with an alkali aqueous solution such as an ammonia aqueous solution while adjusting the pH, whereby it is possible to obtain formation of the precipitate. In this precipitation operation, compression, decompression, heating, and cooling processes may be performed as necessary, and further the precipitate may be left to allow settling for a few hours to several tens of hours. By filtering and washing, then drying and firing the precipitate obtained in such a way, it is possible to obtain a zirconium oxide to which yttrium has been added that can be used in the present invention.

In addition, in the case of impregnation, a mixture in which a water-soluble yttrium salt such as yttrium nitrate and yttrium sulfate has been dissolved is impregnated to zirconium oxide at a predetermined quantitative ratio according to a predetermined mass ratio, while additionally performing treatment such as compression, decompression, heating, cooling, and agitation as necessary, and then a zirconium oxide to which yttrium has been added that can be used in the present invention can be obtained by filtering and drying, followed by drying and firing.

In the second catalyst layer, a heat resistant inorganic oxide other than the cerium oxide-based material and zirconium oxide-based material used in the present invention, such as an alumina-based material, zeolite-based material, and silica-based material may be further added. Gamma alumina is preferred as another heat resistant inorganic oxide.

Blending Amount of Each Constituent

The amount of noble metal of the catalytically active species used in the second catalyst layer is preferably 0.1 to 20 g/L per unit volume of the overall catalyst of the present invention, and more preferably 1 to 10 g/L. If the blending amount is at least 0.1 g/L, purification ability can be exhibited, and a further improving effect is no longer expected even if exceeding 20 g/L.

Here, in a case where a noble metal other than platinum is used in combination as the catalytically active species, the amount of platinum is preferably at least 50% relative to the overall amount of noble metal, more preferably at least 70%, and most preferably at least 90%.

The cerium oxide-based material and heat resistant inorganic oxide employed in the second catalyst layer is preferably 10 to 300 g/L per unit volume of the overall catalyst of the present invention, and more preferably 30 to 150 g/L. If the amount used is at least 10 g/L, it is possible to support noble metal that may exhibit exhaust gas purification ability according to the present invention, and if no greater than 300 g/L, air permeability of exhaust gas in the honeycomb can be sufficiently maintained.

The cerium oxide-based material is preferably 1 to 300 g/L per unit volume of the overall catalyst of the present invention, and more preferably 10 to 200 g/L. If the blending amount is at least 1 g/L, it is possible to exhibit the exhaust gas purification ability of the present invention, and if no greater than 300 g/L, air permeability of exhaust gas in the honeycomb can be sufficiently maintained. It should be noted that, in the case of using cerium oxide and the composite oxide, the ratio thereof is preferably set in the range of 100:0 to 50:50 cerium oxide to composite oxide. In addition, for the zirconium oxide-based material, although the blending amount thereof can be suitably set and is not particularly limited, it is preferably 5 to 50 g/L, and more preferably 10 to 30 g/L. It should be noted that the cerium oxide-based material employed may be used by combining two or more types thereof.

The zirconium oxide-based material is preferably 5 to 50 g/L per unit volume of the overall catalyst of the present invention, and more preferably 10 to 30 g/L. If the blending amount is at least 5 g/L, it is possible to raise the oxygen generating capacity, and if no greater than 50 g/L, more of another NOx adsorbent can be supported, and is thus preferable.

It should be noted that the blending ratio of the cerium oxide-based material and the zirconium oxide-based material contained in the second catalyst layer is preferably in the range of 95:5 to 50:50.

Other Components

A heat resistance improving component or strength improving component such as alumina and silica, and an adhesion improving component (binder) and the like, for example, may be blended into the first catalyst layer and/or the second catalyst layer as other components.

A zirconia-based compound, an alumina-based compound, a silica-based compound or the like can be exemplified as the binder. In addition, an alkali, alkaline earth, noble metal component or the like such as potassium, rubidium, cesium, magnesium, calcium, strontium, barium, antimony, hafnium, tantalum, rhenium, bismuth, gadolinium, holmium, thulium, ytterbium, germanium, selenium, cadmium, indium, scandium, titanium, niobium, chromium, and silver can be exemplified as the heat-resistance improving component or the strength improving component.

Layer Formation of First Catalyst Layer and Second Catalyst Layer

The NOx purifying catalyst of the present invention is characterized in that the dispositional relationship between the first catalyst layer and the second catalyst layer is specified. That is, the second catalyst layer and the first catalyst layer are sequentially laminated on the carrier, and are preferably configured so that the first catalyst layer is the top layer. In addition, the second catalyst layer being the lower layer is preferably configured so that the noble metal content decreases sequentially or step-wise from the first catalyst layer side thereof towards the carrier side thereof. This means that it is not necessary for the lower layer to always be one layer, and it may be configured by multiple layers so that the noble metal content decreases sequentially or step-wise.

Operation of NOx Decreasing System

Next, operation of a NOx decreasing system with the NOx purifying catalyst according to the present invention will be explained. One example of the NOx purifying catalyst is a catalyst having the constitution shown in Table 1 below, and composed of a two layer configuration including the upper layer and lower layer used in the Example described later. In this example, the upper layer corresponds to the first catalyst layer of the present invention, and the lower layer corresponds to the second catalyst layer of the present invention.

TABLE 1

|  | Composition |
| --- | --- |
| Upper Layer | Fe-ion exchanged Beta zeolite $\gamma$-$Al_2O_3$ Zirconia |
| Lower Layer | Pt $\gamma$-$Al_2O_3$ $CeO_2$ Zirconium oxide having 5 wt % yttrium by oxide conversion |

Operation in Low Temperature Range

First Lean State

First, in a state in which the air/fuel ratio of exhaust gas is made lean (normal operating state for a diesel engine), NOx in the exhaust gas passes through the upper layer (first catalyst layer), reaches the lower layer (second catalyst layer) and the NOx is oxidized (e.g., NO to $NO_2$) by noble metal (Pt in this case), while this $NO_2$ is temporarily stored by being temporarily adsorbed to the lower layer (both in the second catalyst layer). At this time, Pt functions as an oxidation catalyst, and CeO₂ functions as a NOx adsorbent.

Rich State

Next, when a state is entered in which the air/fuel ratio of the exhaust gas is made rich, the NOx adsorbed to the lower layer in the first lean state described above is converted to ammonia by way of hydrogen (Chemical Formula 2) generated by the water-gas shift reaction (Chemical Formula 1) described below, and this ammonia transfers to the upper layer and is stored again by adsorbing to the solid acid. At this time, Pt/CeO₂ functions as a water-gas shift catalyst, Pt functions as an $NH_3$ generation catalyst, and Fe ion-exchanged beta zeolite functions as an $NH_3$ adsorbent.

$$CO+H_2O \rightarrow H_2+CO_2 \quad \text{(Chemical Formula 1)}$$

$$NOx+H_2 \rightarrow NH_3 \quad \text{(Chemical Formula 2)}$$

Second Lean State

In a state in which the air/fuel ratio of exhaust gas is made to be lean again, the ammonia stored again in the upper layer and the NOx contained in the exhaust gas react by way of the ammonia selective catalytic reduction process ($NH_3$-SCR) and convert to nitrogen (Chemical Formula 3), and this nitrogen can be released from the surface of the upper layer. At this time, the Fe ion-exchanged beta zeolite functions as an $NH_3$-SCR catalyst.

$$NOx+NH_3+O_2 \rightarrow N_2+H_2O \quad \text{(Chemical Formula 3)}$$

In the above way, since a sequence of a cycle, which is defined by temporary storage of NOx in the lower layer, conversion to ammonia, storing again of ammonia in the upper layer, and reduction to nitrogen in the upper layer and release, takes place more efficiently according to the catalyst configuration described above, it is possible to improve the NOx decreasing efficiency in the low temperature range as well. It should be noted that the low temperature range in the present invention is no higher than 400° C., and preferably no higher than 300° C.

It should be noted that, in the present invention, the lower layer further may be made as a two layer configuration, and as a three layer configuration of an upper layer, an intermediate layer, and a lower layer, for example. In this case, the amount of Pt in the intermediate layer and lower layer may vary, and the Pt content may be made greater in the intermediate layer than in the lower layer. Furthermore, a configuration may be made in which the lower layer does not contain Pt, and Pt is only contained in the intermediate layer.

In addition, in the above-mentioned embodiment, although an example is noted in which the present invention is applied to a diesel internal combustion engine, it can also be applied to a gasoline internal combustion engine. Furthermore, the present invention can also be applied to air/fuel ratio control of an engine for nautical propulsion such as an outboard engine in which the crank shaft is vertical, or the like.

EXAMPLES

Below, the present invention is explained in further detail by way of an Example.

Example

Preparation of NOx Purifying Catalyst

A catalyst of a two layer configuration identical to that in the above-mentioned Table 1 was produced as the NOx purifying catalyst by way of a well-known conventional slurry method. More specifically, each slurry was produced by mixing materials constituting each catalyst layer with a ball mill, coating this slurry onto the carrier indicated below using a wash coat method so as to make the constituent amounts in the constituent table shown in Table 2 below, and drying and firing under the drying and firing conditions indicated below, thereby preparing the NOx purifying catalyst. It should be noted that each material was mixed with a platinum chloride aqueous solution in the production of slurries used in the low layer of the present example.

Carrier
  Size: 25.4φ×60 mm (30 cc)
  Wall thickness: 4.3 mils
  Number of cells: 400
  Material: cordierite
  Shape: flow-through honeycomb structure Drying and Firing Conditions
  Drying temperature: 120° C. (in air)
  Drying time: 1 hour
  Firing apparatus: electric oven
  Firing temperature: 450° C.
  Firing time: 30 minutes

TABLE 2

| | Composition | Proportion (g/L) Example | Proportion (g/L) Comparative Example |
|---|---|---|---|
| Upper Layer | Fe-ion exchanged Beta zeolite | 50 | 50 |
| | γ-Al₂O₃ | 30 | 30 |
| | Zirconia | 5 | 5 |
| Lower Layer | Pt | 4.5 | 4.5 |
| | γ-Al₂O₃ | 30 | 30 |
| | CeO₂ | 120 | 120 |
| | Zirconium oxide having 5 wt % yttrium by oxide conversion | 20 | — |

Comparative Example

As shown in Table 2, the NOx purifying catalyst was prepared under similar conditions to the Example except for zirconium oxide having 5 wt % yttrium by oxide conversion not being contained in the lower layer.

Test Example 1

A catalyst of the configuration of the above-mentioned Example 1 was operated under the test conditions described below, and the NOx purification performance was evaluated. The results thereof are shown in FIG. 1. Here, the horizontal axis of FIG. 1 is catalyst temperature, and the vertical axis is NOx conversion ratio (vol %).

Test Conditions

Measurement Conditions
  Catalyst temperatures: 5 points total of 200° C., 250° C., 300° C., 350° C., and 400° C.
  Lean/rich ratio: 55 sec/5 sec Gas Conditions
  Lean state: 6% O₂, 6% CO₂, 500 ppm C₃H₆, 900 ppm CO, 110 ppm NO, 7% H₂O, balance N₂
  Rich state: 0% O₂, 6% CO₂, 500 ppm C₃H₆, 2% CO, 110 ppm NO, 7% H₂O, balance N₂

Test Example 2

In regards to the NOx purifying catalysts of the Example and Comparative Example, the amounts of hydrogen generated from the water-gas shift reaction were compared by mass spectrometry. The results thereof are shown in Table 2. Here, the horizontal axis in FIG. 2 is the catalyst temperature, and the vertical axis is the amount of hydrogen generated (ion intensity).

Figure 2:
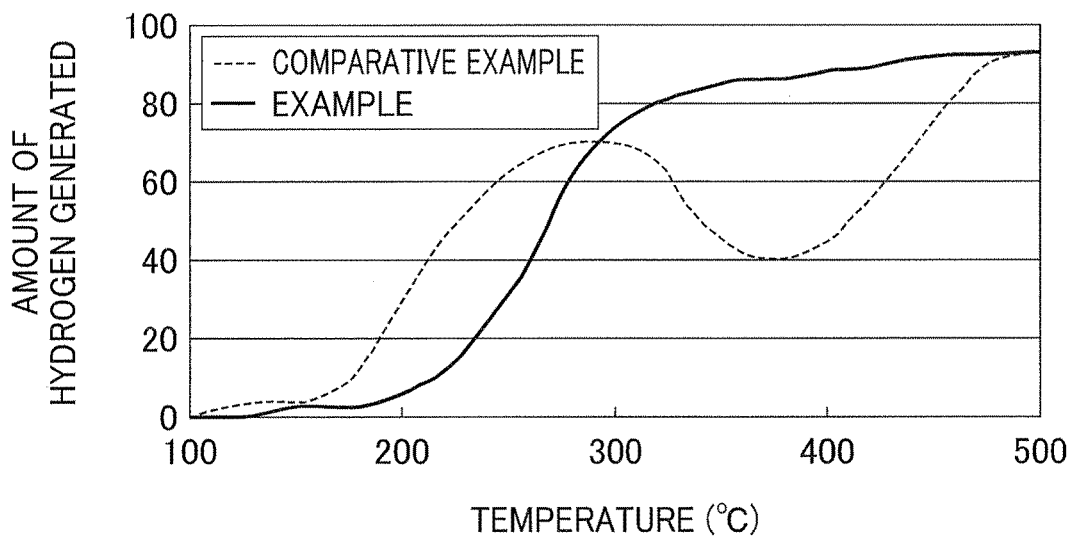
FIG. 2 is a chart showing a relationship between catalyst temperature and an amount of hydrogen generated according to Example.

As is evident from the results of FIG. 2, the amount of hydrogen generated in the Comparative Example declined at around 300 to 400° C. On the other hand, it can be understood that the amount of hydrogen generated increased in the Example.

The invention claimed is:

1. A NOx purifying catalyst used for purification of NOx in exhaust gas emitted from an internal combustion engine in which an air/fuel ratio is controlled to be in a lean or rich state, wherein:
   the catalyst comprises a first catalyst layer and a second catalyst layer;
   NOx passes through the first catalyst layer, and the NOx having thus passed through is oxidized and adsorbed by the second catalyst layer, in the lean state;
   the NOx thus adsorbed by the second catalyst layer is converted to $NH_3$ by a reducing component on the second catalyst layer, and then the $NH_3$ is adsorbed by transferring to the first catalyst layer, in the rich state;
   the $NH_3$ subsequently reacts with NOx to be converted to nitrogen and water;
   the first catalyst layer includes a beta zeolite having elemental iron;
   the second catalyst layer includes A) a noble metal, B) a cerium oxide-based material, and C) a zirconium oxide-based material having at least one selected from the group consisting of scandium, yttrium, and a rare-earth metal, the second catalyst layer being configured so that content of the noble metal decreases sequentially or step-wise from a side of the first catalyst layer toward a carrier side thereof; and
   the second catalyst layer and the first catalyst layer are sequentially laminated on a carrier, and the first catalyst layer is formed so as to be a top layer.

2. The NOx purifying catalyst according to claim 1, wherein:
   the zirconium oxide-based material includes the rare-earth metal;
   zirconium in the zirconium oxide-based material is at least 50 wt % by oxide conversion; and
   the rare-earth metal in the zirconium oxide-based material is in the range of 5 to 30 wt % by oxide conversion.

3. The NOx purifying catalyst according to claim 1, wherein the beta zeolite having elemental iron in the first catalyst layer further includes elemental cerium.

4. The NOX purifying catalyst according to claim 1, wherein the reducing component is at least one component in the exhaust gas selected from the group consisting of carbon monoxide, a hydrocarbon component, and hydrogen generated from at least one of the carbon monoxide and hydrocarbon component contacting the second catalyst layer.

5. The NOx purifying catalyst according to claim 1, wherein the second catalyst layer further includes a heat resistant inorganic oxide.

6. The NOx purifying catalyst according to claim 1, wherein the cerium oxide-based material of the second catalyst layer is at least one of cerium oxide and a composite oxide of a rare-earth element and cerium.

* * * * *